Sept. 20, 1966   C. L. SPORCK   3,273,368
METAL WORKING
Filed Oct. 3, 1963

INVENTOR
Claus L. Sporck
BY
Synnestvedt & Lechner
ATTORNEY

United States Patent Office 3,273,368
Patented Sept. 20, 1966

3,273,368
METAL WORKING
Claus L. Sporck, Cincinnati, Ohio, assignor to The Lodge & Shipley Company, Cincinnati, Ohio, a corporation of Ohio
Filed Oct. 3, 1963, Ser. No. 313,646
2 Claims. (Cl. 72—78)

This invention in general relates to tube forming equipment and in particular relates to an improved arrangement of rollers for working tubes, the arrangement providing for highly useful and desirable advantages.

In a preferred aspect the invention contemplates a rotatable head mounting a pair of rollers, one being a ring type with an internal working surface and the other being a disc type with an exterior working surface, with the rollers being disposed so that the working surfaces respectively engage the tube on diametrically opposed areas.

One of the objects of the invention is to provide roller-type tube forming equipment arranged to take advantage of the desirable features of ring and disc type rollers.

Another object of the invention is to provide roller-type tube forming equipment including a ring type and a disc type roller, the working surfaces of which engage the tube so that the working force of one roller radially balances the working force of the other roller.

Another object of the invention is to provide roller-type tube forming equipment including a ring type roller and a disc type roller constructed and arranged for adjustment to accommodate working tubes of widely varying outside diameters and to adjust for making tubes of varying wall thicknesses.

Figure 2:
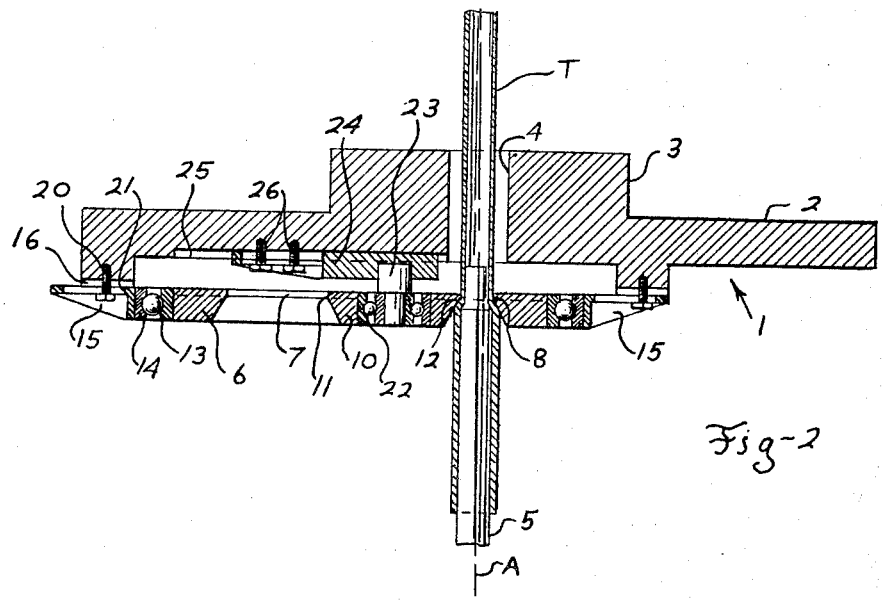
Figure 1:
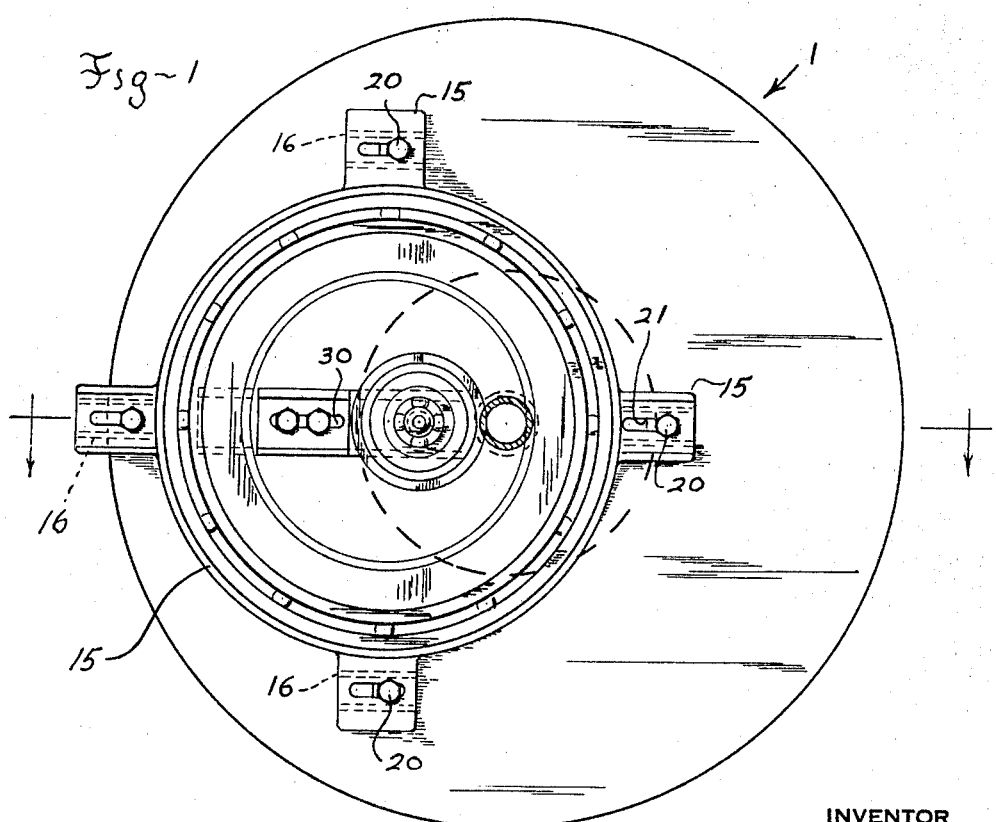

A typical embodiment of the invention will be described below in conjunction with the drawings wherein:

FIGURE 1 is a front elevational view of a roller head constructed in accordance with the invention; and FIGURE 2 is a plan view in section taken along the line 2—2 of FIGURE 1.

As shown the roller head 1 includes a frame 2 having a boss 3 by means of which the head is chucked in the rotary spindle of a tube forming machine, for example, a tube forming machine of the kind shown in my copending application Serial No. 277,623, filed May 2, 1963, now Patent No. 3,191,415. The boss 3 is adapted to cause the frame 2 to rotate about the axis A. The boss 3 is provided with a bore 4 which accommodates the tube T being formed. The work mandrel 5 which supports the tube T has its axis coaxial with the axis A.

The frame 1 carries the ring type roller 6 having an internal working surface 7 which engages the tube as indicated at 8. Nested inside of the ring type roller 6 is a disc type roller 10 having an exterior working surface 11 engaging the tube as indicated at 12. The engagement areas 8 and 12 are diametrically opposed to one another so that the working forces on the tube are radially balanced.

The ring-type roller 6 is mounted for rotation relative to the frame 2 by means of the bearings 13, the outer race 14 of which is connected to a ring-like slide 15 having a plurality of dovetailed connections with the frame 2 as indicated at 16. The bolts 20 are accommodated by the slots 21 on the slide 15. By loosening the bolts, the slide can be shifted and this provides for the ring roller 6 to be adjusted with respect to the axis A (left and right as viewed in FIGURE 1).

The disc roller 10 is rotatably mounted with respect to the frame 2 by means of the bearings 22 disposed on the stud 23 fixed to the slide 24. The slide 24 is dovetailed with respect to the frame as indicated at 25. The bolts 26 operate in the slot 30 in the slide 24. By loosening the bolts 26, the slide hence the roller can be moved toward and away from the axis A.

The above described adjustments of rollers 6 and 10 is to accommodate tubes having differing outside diameters and also to accommodate tubes of differing wall thickness. The adjustment maintains the diametrically opposed positions of the rollers 6 and 10 so as to maintain radial balance.

I claim:
1. A roller head for a tube forming machine comprising:
   a frame formed with a central bore to accommodate a tube to be worked;
   means on said frame for mounting the frame for rotation about an axis extending through said bore, said rotational axis being coaxial with the axis of the tube to be worked;
   a first roller in the form of a ring having an interior, annular working surface surrounding said axis, the roller working surface being engageable with a tube to be worked;
   a slide surrounding said first roller;
   bearing means connected between said slide and said first roller and providing for the roller to be rotatable relative to the slide;
   means connecting said slide with said frame for movement in a direction to adjust the working surface of said first roller toward and away from said rotational axis;
   a second roller in the form of a disc and having an exterior working surface for engaging a tube to be worked, the working surfaces of the first and second rollers being respectively disposed on diametrically opposite sides of said rotational axis so that the working force of one surface radially balances the working force of the other;
   a second slide and means rotatably mounting said second roller on said second slide; and
   means connecting said second slide with said frame for movement in a direction to adjust the working surface of said second roller toward and away from said rotational axis, said roller adjustments maintaining said diametrically opposed positions.

2. A roller head for a tube forming machine comprising:
   a frame formed with a central bore to accommodate a tube to be worked;
   means on said frame for mounting the frame for rotation about an axis extending through said bore, said rotational axis being coaxial with the axis of the tube to be worked;
   a first roller in the form of a ring having an interior, annular working surface surrounding said axis, the roller working surface being engageable with a tube to be worked;
   means connecting said first roller with said frame and providing for rotation of the roller relative to the frame and for movement of the roller in a direction to adjust the working surface of the roller toward and away from said rotational axis;

a second roller in the form of a disc and having an exterior working surface for engaging a tube to be worked, the working surfaces of the first and second rollers being respectively disposed on diametrically opposite sides of said rotational axis so that the working force of one surface radially balances the working force of the other; and means connecting said second roller with said frame and providing for rotation of the roller relative to the frame and for movement of the roller in a direction to adjust the working surface of the roller toward and away from said rotational axis, said adjustments of the first and second rollers maintaining said diametrically opposed positions.

References Cited by the Examiner

UNITED STATES PATENTS

| | | | |
|---|---|---|---|
| 200,522 | 2/1878 | Fairbairn et al. | 72—91 |
| 1,366,717 | 1/1921 | Clark | 72—92 |
| 3,196,651 | 7/1965 | Karrberg et al. | 72—91 |

FOREIGN PATENTS 1,173,888   3/1959   France.

CHARLES W. LANHAM, *Primary Examiner.*

H. D. HOINKES, *Assistant Examiner.*